US011909033B2

(12) United States Patent
Tsuzuki et al.

(10) Patent No.: US 11,909,033 B2
(45) Date of Patent: Feb. 20, 2024

(54) NEGATIVE ELECTRODE INCLUDING FIRST LAYER HAVING LOW COMPRESSIVE STRENGTH CARBON ACTIVE MATERIAL AND SILICON ACTIVE MATERIAL AND SECOND LAYER HAVING HIGH COMPRESSIVE STRENGTH CARBON ACTIVE MATERIAL AND NONAQUEOUS ELECTROLYTE SECONDARY BATTERY INCLUDING THE SAME

(71) Applicants: Panasonic Corporation, Kadoma (JP); SANYO Electric Co., Ltd., Daito (JP)

(72) Inventors: Kouhei Tsuzuki, Hyogo (JP); Yuki Morikawa, Hyogo (JP); Hirokazu Wada, Osaka (JP); Yuta Matsuo, Hyogo (JP); Kaori Ishikawa, Hyogo (JP); Katsunori Yanagida, Hyogo (JP)

(73) Assignees: PANASONIC HOLDINGS CORPORATION, Kadoma (JP); PANASONIC ENERGY CO., LTD., Osaka (JP)

( * ) Notice: Subject to any disclaimer, the term of this patent is extended or adjusted under 35 U.S.C. 154(b) by 736 days.

(21) Appl. No.: 16/982,284

(22) PCT Filed: Jan. 22, 2019

(86) PCT No.: PCT/JP2019/001801
§ 371 (c)(1),
(2) Date: Sep. 18, 2020

(87) PCT Pub. No.: WO2019/187537
PCT Pub. Date: Oct. 3, 2019

(65) Prior Publication Data
US 2021/0013496 A1 Jan. 14, 2021

(30) Foreign Application Priority Data
Mar. 30, 2018 (JP) ................. 2018-068723

(51) Int. Cl.
H01M 4/36 (2006.01)
H01M 4/133 (2010.01)
(Continued)

(52) U.S. Cl.
CPC ........... H01M 4/366 (2013.01); H01M 4/133 (2013.01); H01M 4/134 (2013.01); H01M 4/364 (2013.01);
(Continued)

(58) Field of Classification Search
CPC ...... H01M 4/366; H01M 4/133; H01M 4/134; H01M 4/364; H01M 4/386; H01M 4/587; H01M 10/0525
(Continued)

(56) References Cited

U.S. PATENT DOCUMENTS 5,677,082 A * 10/1997 Greinke ................ H01M 4/133
429/312
6,524,749 B1 2/2003 Kaneda et al.
(Continued)

FOREIGN PATENT DOCUMENTS

EP 2797143 A1 10/2014
JP 2000-268824 A 9/2000
(Continued)

OTHER PUBLICATIONS

International Search Report dated Apr. 23, 2019, issued in counterpart application No. PCT/JP2019/001801 (1 page).
(Continued)

Primary Examiner — Sean P Cullen
(74) Attorney, Agent, or Firm — WHDA, LLP

(57) ABSTRACT

In a nonaqueous electrolyte secondary battery, a negative electrode mix layer includes a first layer and a second layer disposed successively from a negative electrode collector. The first layer contains a first carbon-based active material
(Continued)

having a 10% compressive strength of 3 MPa or less and a silicon-based active material containing Si. The second layer contains a second carbon-based active material having a 10% compressive strength of 5 MPa or more and has a lower content (mass ratio) of the silicon-based active material than the first layer.

7 Claims, 1 Drawing Sheet

(51) Int. Cl.
    *H01M 4/134*     (2010.01)
    *H01M 4/38*     (2006.01)
    *H01M 4/587*     (2010.01)
    *H01M 10/0525*     (2010.01)
    *H01M 4/02*     (2006.01)

(52) U.S. Cl.
    CPC ........... *H01M 4/386* (2013.01); *H01M 4/587* (2013.01); *H01M 10/0525* (2013.01); *H01M 2004/021* (2013.01); *H01M 2004/027* (2013.01)

(58) Field of Classification Search
    USPC ........................................... 429/218.1, 231.8
    See application file for complete search history.

(56) References Cited

U.S. PATENT DOCUMENTS

| | | |
|---|---|---|
| 2011/0287317 A1 | 11/2011 | Nakanishi |
| 2015/0194668 A1 | 7/2015 | Ueda et al. |
| 2016/0056471 A1 | 2/2016 | Sugimori et al. |
| 2018/0062158 A1* | 3/2018 | Kim ...................... H01M 4/364 |
| 2020/0006761 A1 | 1/2020 | Fujino et al. |

FOREIGN PATENT DOCUMENTS

| | | | | |
|---|---|---|---|---|
| JP | 2009004139 A | * | 1/2009 | ........ H01M 10/0525 |
| JP | 2010238426 A | * | 10/2010 | |
| JP | 2015-38862 A | | 2/2015 | |
| JP | 2015-49965 A | | 3/2015 | |
| JP | 6211595 B2 | | 10/2017 | |
| WO | 2018/003929 A1 | | 1/2018 | |

OTHER PUBLICATIONS

Extended (Supplementary) European Search Report dated Apr. 30, 2021, issued in counterpart EP application No. 19775915.2. (8 pages).

* cited by examiner

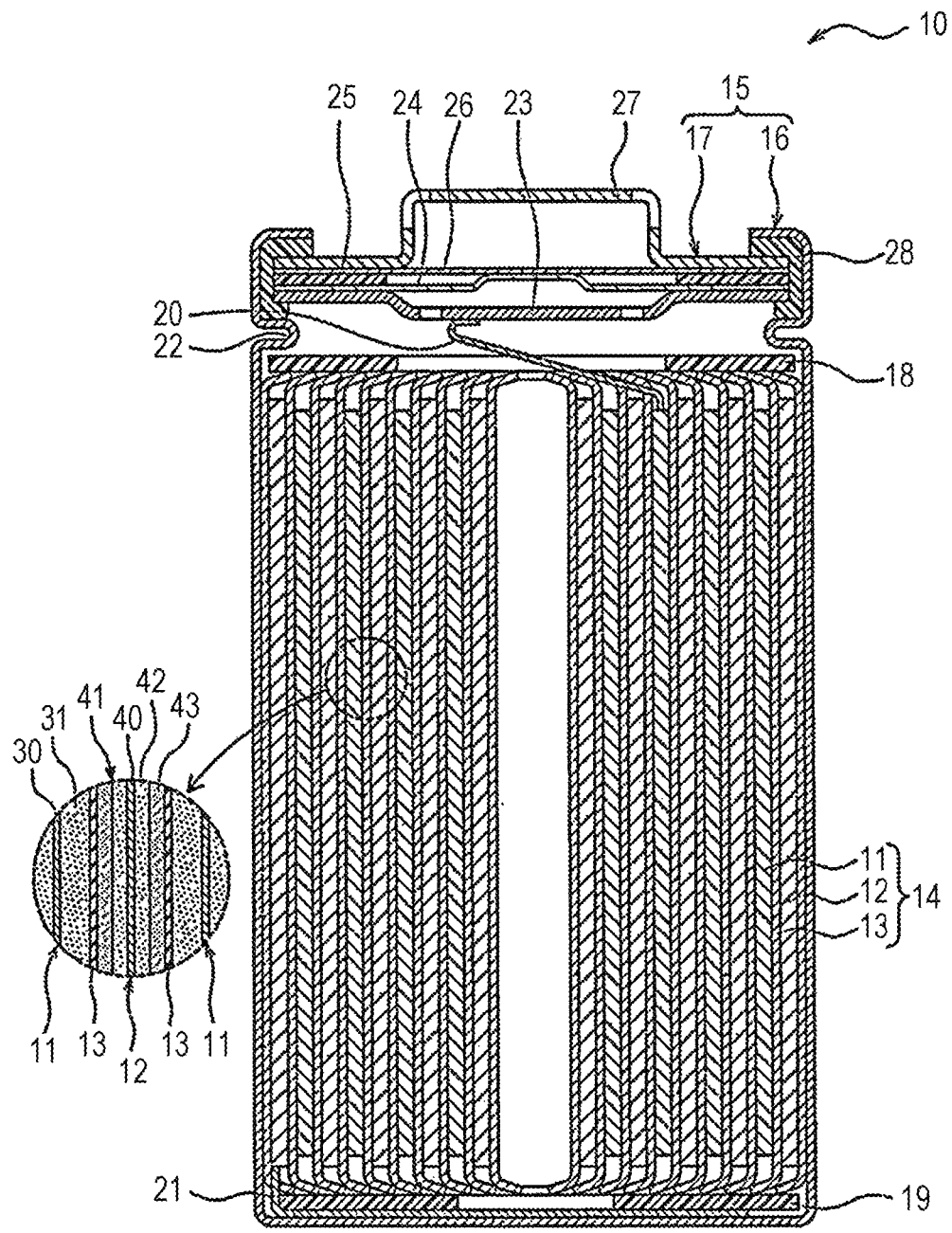

NEGATIVE ELECTRODE INCLUDING FIRST LAYER HAVING LOW COMPRESSIVE STRENGTH CARBON ACTIVE MATERIAL AND SILICON ACTIVE MATERIAL AND SECOND LAYER HAVING HIGH COMPRESSIVE STRENGTH CARBON ACTIVE MATERIAL AND NONAQUEOUS ELECTROLYTE SECONDARY BATTERY INCLUDING THE SAME

TECHNICAL FIELD

The present disclosure relates to a negative electrode for a nonaqueous electrolyte secondary battery and a nonaqueous electrolyte secondary battery.

BACKGROUND ART

To date, it is known that compounds containing Si denoted by $SiO_x$ such as silicon oxides can occlude a larger amount of lithium ions per unit volume than carbon-based active materials such as graphite. Using a silicon-based active material containing Si as a negative electrode active material enables the energy density of a battery to be increased. In addition, it is known that using hard graphite particles containing a large amount of amorphous component improves output characteristics of a battery. PTL 1 proposes a nonaqueous electrolyte secondary battery in which a collector-side region and a surface-side region of a negative electrode mix layer include respective carbon-based active materials having particle shapes different from each other so as to improve the battery performance, for example, output characteristics.

CITATION LIST

Patent Literature

PTL 1: Japanese Patent No. 6211595

SUMMARY OF INVENTION

In recent years, nonaqueous electrolyte secondary batteries with high energy density and excellent output characteristics have been desired. However, there is room for further improvement in technologies in the related art including the technologies disclosed in PTL 1. For example, in the case in which a silicon-based active material and hard graphite particles containing a large amount of amorphous component are simply used in combination to improve the energy density and the output characteristics, there is a problem that the graphite particles are difficult to follow the volume change of the silicon-based active material and conduction paths in the negative electrode mix layer are cut off so as to increase the resistance value to a great extent.

A negative electrode for nonaqueous electrolyte secondary battery according to an aspect of the present disclosure includes a negative electrode collector and a negative electrode mix layer disposed on the negative electrode collector, wherein the negative electrode mix layer includes a first layer and a second layer disposed successively from the negative electrode collector, the first layer contains a first carbon-based active material having a 10% compressive strength of 3 MPa or less and a silicon-based active material containing Si, and the second layer contains a second carbon-based active material having a 10% compressive strength of 5 MPa or more and has a lower content (mass ratio) of the silicon-based active material than the first layer.

A nonaqueous electrolyte secondary battery according to an aspect of the present disclosure includes the above-described negative electrode, a positive electrode, a separator, and a nonaqueous electrolyte.

According to an aspect of the present disclosure, a nonaqueous electrolyte secondary battery with high energy density and excellent output characteristics can be provided.

BRIEF DESCRIPTION OF DRAWING

The FIGURE is a sectional view of a nonaqueous electrolyte secondary battery that is an example of an embodiment.

DESCRIPTION OF EMBODIMENTS

As described above, regarding the nonaqueous electrolyte secondary battery, ensuring compatibility between high energy density and excellent output characteristics is an important issue. The present inventors performed intensive research to address the above-described issue and, as a result, succeeded in realizing a nonaqueous electrolyte secondary battery with high energy density and excellent output characteristics by using a negative electrode mix layer including the above-described first layer and the second layer. It is conjectured that disposing the first layer containing a silicon-based active material and a soft carbon-based active material having low 10% compressive strength and the second layer containing a hard carbon-based active material having high 10% compressive strength suppresses conduction path cut-off which may occur due to a large volume change of the silicon-based active material in accordance with charging and discharging and that, as a result, favorable output characteristics are maintained for a long time.

The hardness of the carbon-based active material is in accordance with the degree of graphitization, the amount of amorphous component, and the amount of voids inside a particle. In general, as the degree of graphitization increases and as the proportion of the amorphous component increases, the carbon-based active material becomes harder and the 10% compressive strength increases. An increase in the amount of voids is advantageous to the output characteristics. However, for example, if the firing temperature of the active material is increased to increase the degree of graphitization, voids are reduced. As described later in detail, the present inventors succeeded in synthesizing graphite having hardness and a high porosity by using small-diameter nuclear graphite and by devising a method for mixing with a pitch material and a firing temperature. It is preferable that such graphite is used for the second layer. An example of an embodiment will be described below in detail with reference to the drawing.

Hereafter a cylindrical battery in which a rolled electrode body 14 is stored in a cylindrical battery case is exemplified. However, the electrode body is not limited to the roll type and may be a multilayer type in which a plurality of positive electrodes and a plurality of negative electrodes are alternately stacked with separators interposed therebetween. Alternatively, the nonaqueous electrolyte secondary battery according to the present disclosure may be a square battery provided with a square metal case, a coin-type battery provided with a coin-type metal case, or the like or a laminate battery provided with an outer jacket member composed of a laminate sheet including a metal layer and a resin layer.

The FIGURE is a sectional view of a nonaqueous electrolyte secondary battery 10 that is an example of the embodiment. As exemplified in the FIGURE, the nonaqueous electrolyte secondary battery 10 includes an electrode body 14, a nonaqueous electrolyte (not shown in the drawing), and a battery case 15 for storing the electrode body 14 and the nonaqueous electrolyte. The electrode body 14 includes a positive electrode 11, a negative electrode 12, and a separator 13 and has a rolling structure in which the positive electrode 11 and the negative electrode 12 are rolled with the separator 13 interposed therebetween. The battery case 15 is composed of an outer jacket can 16 having a cylindrical shape with a bottom and a sealing body 17 that seals the opening portion of the outer jacket can 16.

The nonaqueous electrolyte contains a nonaqueous solvent and an electrolyte salt dissolved in the nonaqueous solvent. Regarding the nonaqueous solvent, for example, esters, ethers, nitriles, and amides and mixed solvents of at least two of these may be used. The nonaqueous solvent may contain a halogen substitution product in which at least some hydrogen atoms of the solvent are substituted with halogen atoms such as fluorine. In this regard, the nonaqueous electrolyte is not limited to a liquid electrolyte and may be a solid electrolyte including a gel polymer or the like. A lithium salt, for example, $LiPF_6$, is used as an electrolytic salt.

The nonaqueous electrolyte secondary battery 10 has insulating plates 18 and 19 arranged on the top and bottom, respectively, of the electrode body 14. In the example shown in the FIGURE, a positive electrode lead 20 attached to the positive electrode 11 extends toward the sealing body 17 through a through hole of the insulating plate 18, and a negative electrode lead 21 attached to the negative electrode 12 extends toward the bottom portion of the outer jacket can 16 while passing outside the insulating plate 19. The positive electrode lead 20 is connected to the lower surface of a filter 23 that is a bottom plate of the sealing body 17 by welding or the like, and a cap 27 that is electrically connected to the filter 23 and that is a top plate of the sealing body 17 serves as a positive electrode terminal. The negative electrode lead 21 is connected to the inner surface of the bottom portion of the outer jacket can 16 by welding or the like, and the outer jacket can 16 serves as a negative electrode terminal.

The outer jacket can 16 is, for example, a metal container having a cylindrical shape with a bottom. A gasket 28 is disposed between the outer jacket can 16 and the sealing body 17 so as to ensure the sealing performance inside the battery. The outer jacket can 16 is provided with an overhanging portion 22 that is, for example, part of the side surface portion overhanging inward and that supports the sealing body 17. Preferably, the overhanging portion 22 is formed into an annular shape in the circumferential direction of the outer jacket can 16, and the upper surface of the overhanging portion 22 supports the sealing body 17.

The sealing body 17 has a structure in which the filter 23, a lower valve body 24, an insulating member 25, an upper valve body 26, and the cap 27 are stacked successively from the electrode body 14. Each member constituting the sealing body 17 has, for example, a disc shape or a ring shape, and the members excluding the insulating member 25 are electrically connected to each other. The center portion of the lower valve body 24 and the center portion of the upper valve body 26 are connected to each other, and the insulating member 25 is interposed between the peripheral edge portions of the lower valve body 24 and the upper valve body 26. When the internal pressure of the battery is increased due to irregular heat generation, the lower valve body 24 is deformed so as to push up the upper valve body 26 toward the cap 27 and is ruptured, and, as a result, a current path between the lower valve body 24 and the upper valve body 26 is cut off. When the internal pressure is further increased, the upper valve body 26 is ruptured, and gas is discharged through an opening portion of the cap 27.

The constituents of the electrode body 14, in particular, the negative electrode 12, will be described below in detail.

[Positive Electrode]

The positive electrode 11 has a positive electrode collector 30 and a positive electrode mix layer 31 disposed on the positive electrode collector 30. Foil of a metal that is stable in the potential range of the positive electrode 11, for example, aluminum or an aluminum alloy, a film provided with the metal on the surface layer, or the like may be used for the positive electrode collector 30. Preferably, the positive electrode mix layer 31 contains a positive electrode active material, a conductive material such as acetylene black, and a binder such as polyvinylidene fluoride (PVdF) and is disposed on both surfaces of the positive electrode collector 30. The positive electrode 11 may be produced by, for example, coating the positive electrode collector 30 with a positive electrode mix slurry containing the positive electrode active material, the conductive material, the binder, and the like, drying the coating film, and performing compression so as to form positive electrode mix layers 31 on the respective surfaces of the positive electrode collector 30.

Regarding the positive electrode active material, for example, a lithium metal complex oxide is used. Examples of the metal element contained in the lithium metal complex oxide include Ni, Co, Mn, Al, B, Mg, Ti, V, Cr, Fe, Cu, Zn, Ga, Sr, Zr, Nb, In, Sn, Ta, and W. An example of favorable lithium metal complex oxides is a lithium metal complex oxide containing at least one of Ni, Co, and Mn. Specific examples include a lithium metal complex oxide containing Ni, Co, and Mn and a lithium metal complex oxide containing Ni, Co, and Al. In this regard, for example, inorganic particles such as tungsten oxide, aluminum oxide, and a lanthanoid-containing compound, or the like may be fixed to the particle surfaces of the lithium metal complex oxide.

[Negative Electrode]

The negative electrode 12 has a negative electrode collector 40 and a negative electrode mix layer 41 disposed on the negative electrode collector 40. Foil of a metal that is stable in the potential range of the negative electrode 12, for example, copper, a film provided with the metal on the surface layer, or the like may be used for the negative electrode collector 40. Preferably, the negative electrode mix layer 41 contains a negative electrode active material and a binder and is disposed on both surfaces of the negative electrode collector 40. The negative electrode 12 may be produced by, for example, coating the negative electrode collector 40 with a negative electrode mix slurry containing the negative electrode active material, the binder, and the like, drying the coating film, and performing compression so as to form negative electrode mix layers 41 on the respective surfaces of the negative electrode collector 40.

The negative electrode mix layer 41 includes a first layer 42 and a second layer 43 disposed successively from the negative electrode collector 40. The first layer 42 contains a first carbon-based active material having a 10% compressive strength of 3 MPa or less (hereafter referred to as carbon-based active material A) and a silicon-based active material containing Si. The second layer 43 contains a second carbon-based active material having a 10% compressive strength of 5 MPa or more (hereafter referred to as carbon-based active material B) and has a lower content (mass ratio) of the silicon-based active material than the first layer 42. Each of the carbon-based active materials A and B is a negative electrode active material formed of a carbon material and, preferably, contains graphite as a primary component. Examples of the graphite include natural graphite such as flake graphite, vein graphite, and amorphous graphite and artificial graphite such as massive artificial graphite and graphitized mesophase carbon microbeads.

The negative electrode mix layer 41 may include a third layer but preferably has a two-layer structure composed of the first layer 42 and the second layer 43. Preferably, the two-layer structure is disposed on both surfaces of the negative electrode collector 40. Meanwhile, the negative electrode mix layer 41 may contain a negative electrode active material other than the carbon-based active materials A and B and the silicon-based active material within the bounds of not impairing the purpose of the present disclosure.

The carbon-based active materials A and B having different hardness are added to the first layer 42 and the second layer 43, respectively. The carbon-based active material A of the first layer 42 is softer than the carbon-based active material B of the second layer 43. Meanwhile, the first layer 42 has a larger content of the silicon-based active material than the second layer 43, and it is preferable that second layer 43 have substantially no silicon-based active material. The content of the silicon-based active material in each layer is the ratio of the mass of the silicon-based active material contained in the layer concerned to the total mass of the layer concerned. The negative electrode mix layer 41 having the two-layer structure enables a high energy density and excellent output characteristics to be obtained. It is conjectured that soft carbon-based active material A relaxes a large volume change of the silicon-based active material in accordance with charging and discharging so as to suppress conduction paths from being cut off while hard carbon-based active material B ensures favorable output characteristics.

The thickness of the negative electrode mix layer 41 is, for example, 20 µm to 120 µm per surface of the negative electrode collector 40. The thickness of the first layer 42 is preferably 30% to 80% and more preferably 50% to 70% of the thickness of the negative electrode mix layer 41. The thickness of the second layer 43 is preferably 20% to 70% and more preferably 30% to 50% of the thickness of the negative electrode mix layer 41. In this case, compatibility between high energy density and favorable output characteristics is readily ensured. For example, the thickness of the second layer 43 may be less than or substantially equal to the thickness of the first layer 42.

As described above, it is preferable that the silicon-based active material be contained in the first layer 42 only. The silicon-based active material is Si or a compound containing Si and is preferably a silicon oxide denoted by $SiO_x$ ($0.5 \leq x \leq 1.6$). The silicon oxide denoted by $SiO_x$ has a structure in which Si fine particles are dispersed in an amorphous $SiO_2$ matrix. Alternatively, the silicon-based active material may be a compound denoted by $Li_{2y}SiO_{(2+y)}$ ($0<y<2$) in which Si fine particles are dispersed in a lithium silicate phase.

It is preferable that a conductive coating film composed of a material having higher conductivity than Si or the compound containing Si be disposed on the particle surfaces of the silicon-based active material. Examples of the constituent material of the conductive coating film include at least one selected from carbon materials, metals, and metal compounds. Of these, carbon materials such as amorphous carbon materials are preferable. The carbon coating film may be formed by, for example, a CVD method in which acetylene, methane, or the like is used or a method in which coal pitch, petroleum pitch, a phenol resin, or the like is mixed with a silicon-based active material and heat treatment is performed. Alternatively, the conductive coating film may be formed by fixing a conductive filler such as carbon black to particle surfaces of a silicon-based active material by using a binder.

The content of the silicon-based active material in the first layer 42 is, for example, 4% to 20% by mass and preferably 6% to 12% by mass relative to the total mass of the first layer 42. The mixing ratio of carbon-based active material A to the silicon-based active material is, for example, 1:99 to 20:80 and preferably 5:95 to 15:85 on a mass ratio basis. The amount of the silicon-based active material added being within the above-described range readily ensures compatibility between high energy density and favorable output characteristics or favorable cycle characteristics.

The median diameter on a volume basis (hereafter referred to as D50) of the silicon-based active material such as silicon oxides denoted by $SiO_x$ is preferably 0.5 times or less the D50 of the carbon-based active material A. In this case, a volume change of the silicon-based active material is readily relaxed by carbon-based active material A. The D50 of the silicon-based active material is, for example, 0.5 to 20 µm. As the particle diameter of the silicon-based active material decreases, a volume change in accordance with charging and discharging tends to decrease. The D50 of each of carbon-based active materials A and B is, for example, 5 to 30 µm. The D50 of each of the silicon-based active material and carbon-based active materials A and B is measured with, for example, a laser diffraction/scattering particle size distribution analyzer (trade name "LA-920" produced by HORIBA, Ltd.).

As described above, carbon-based active material A is a soft particle having a 10% compressive strength of 3 MPa or less. On the other hand, carbon-based active material B is a hard particle having a 10% compressive strength of 5 MPa or more. Carbon-based active material A relaxes a volume change of the silicon-based active material, and carbon-based active material B improves output characteristics. Disposing the second layer 43 containing carbon-based active material B as the surface portion of the negative electrode 12 and disposing the first layer 42 containing the silicon-based active material and carbon-based active material A to face the negative electrode collector 40 enable high output and high energy density to be efficiently realized and enable the cycle characteristics to be improved. In this regard, carbon-based active material B may be mixed into the first layer 42 and carbon-based active material A may be mixed into the second layer 43 within the bounds of not impairing the purpose of the present disclosure.

In the present specification, the 10% compressive strength denotes a pressure when a particle of carbon-based active material A or carbon-based active material B is compressed by 10% on a volume ratio basis. The 10% compressive strength of a particle of carbon-based active material A or carbon-based active material B may be measured by using a micro compression tester (MCT-211 produced by SHIMADZU CORPORATION) or the like. A particle having a particle diameter equal to D50 of carbon-based active material A or carbon-based active material B is subjected to the measurement.

Carbon-based active material A may have no voids in a particle. However, it is preferable that carbon-based active material B have voids in a particle. Specifically, carbon-based active material B has a porosity of favorably 1% to 5%. In this case, the output characteristics can be readily improved while the hardness is ensured so that the 10% compressive strength is 5 MPa or more. The porosity of carbon-based active material A is, for example, 2 to 10. The porosity of each of carbon-based active material A and carbon-based active material B may be measured by using an ion milling system so as to form a cross section of an active material and by performing observation with a scanning electron microscope (SEM).

Carbon-based active material A may contain substantially no amorphous component (amorphous carbon). However, it is preferable that carbon-based active material B contain an amorphous component. Specifically, carbon-based active material B contains preferably 1% to 5% by mass of amorphous component. In this case, the 10% compressive strength of 5 MPa or more is readily ensured. The amount of amorphous component in carbon-based active material A is, for example, 0.1% to 2% by mass and is less than the amount of amorphous component in carbon-based active material B.

The amount of amorphous component (amount of amorphous carbon) in each of carbon-based active materials A and B may be quantified by Raman spectroscopic measurement. In the Raman spectrum of each of carbon-based active materials A and B, a peak of G-band derived from a graphite structure appears at about 1,590 $cm^{-1}$, and a peak of D-band derived from a defect appears at about 1,350 $cm^{-1}$. The peak intensity ratio of D-band/G-band can be used as an indicator of the amount of amorphous carbon, and a higher ratio indicates that the amount of amorphous carbon is larger.

The D-band/G-band ratio is determined by, for example, subjecting the cross section of each of the first layer 42 and the second layer 43 to Raman spectroscopic measurement. In the case in which carbon-based active material A only is contained as the carbon-based active material in the first layer 42, the D-band/G-band ratio (R-value) of the first layer 42 is the ratio of carbon-based active material A (the same applies to carbon-based active material B in the second layer 43). The D-band/G-band ratio of carbon-based active material A is preferably 0.05 to 0.2. The D-band/G-band ratio of carbon-based active material B is preferably 0.1 to 2.0. The ratio of the D-band/G-band ratio of the Raman spectrum of the second layer 43 to the D-band/G-band ratio of the Raman spectrum of the first layer 42 is preferably 2 to 10 and more preferably 4 to 6.

The amorphous carbon is carbon in which a graphite crystal structure is not developed and is carbon in an amorphous or microcrystalline state with a turbostratic structure. More specifically, the amorphous carbon is denoted as a component having a d(002) spacing based on X-ray diffraction of 0.342 nm or more. Specific examples of the amorphous carbon include hard carbon (non-graphitizable carbon), soft carbon (graphitizable carbon), carbon black, carbon fiber, and activated carbon. The amorphous carbon is obtained by, for example, subjecting a resin or a resin composition to carbonization treatment. Regarding the raw material for forming the amorphous carbon, phenolic thermosetting resins, thermoplastic resins such as polyacrylonitriles, petroleum- or coal-based tar or pitch, and the like may be used.

Carbon black is obtained by, for example, thermally decomposing (thermal decomposition method, incomplete combustion method) hydrocarbons serving as the raw materials. Examples of the thermal decomposition method include a thermal method and an acetylene decomposition method. Examples of the incomplete combustion method include a contact method, a lamp turpentine-soot method, a gas furnace method, and an oil furnace method. Specific examples of carbon black obtained by these methods include acetylene black, Ketjenblack (trade name of an industrial carbon black), thermal black, and furnace black.

Preferably, the amorphous carbon exists in the state of being fixed to the surface of graphite-based carbon. In this regard, being fixed is a state of being chemically and/or physically bonded and denotes that amorphous carbon is not isolated from the surface of the graphite-based carbon even when the negative electrode active material is agitated in water or an organic solvent. The physical properties and the amount of fixation of the amorphous carbon in the carbon-based active material may be adjusted by, for example, the type and the amount of raw material (for example, petroleum- or coal-based tar or pitch), the temperature and the time of the carbonization treatment, and the like.

As described above, it is preferable that carbon-based active material B contained in the second layer 43 have hardness represented by the 10% compressive strength of 5 MPa or more and a porosity of 1% to 5%. Such carbon-based active material B is composed of a core portion having voids and a shell portion arranged to cover the core portion. Desirably, the core portion has a structure which is composed of graphite and amorphous carbon and which has voids inside. The shell portion is composed of amorphous carbon and has a thickness of preferably 50 nm or more. The weight ratio of the core portion to the shell portion is desirably 99:1 to 95:5. The porosity of the shell portion is preferably lower than the porosity of the core portion. It is desirable that the porosity of the core portion be 1% to 5% and the porosity of the shell portion be 0.01% to 1%. Carbon-based active material B in which the shell portion has a predetermined thickness and the porosity is low exhibits improved 10% compressive strength. Using carbon-based active material B enables a reduction in the output due to maintenance of voids in the internal core portion becoming difficult because of collapse of particles during compression of the negative electrode 12 to be suppressed.

For example, the core portion is formed by mixing graphite and a graphitizable binder, performing heating in an inert gas atmosphere or a non-oxidizing atmosphere at 500° C. to 3,000° C., and subjecting the resulting carbonized material to powder processing such as pulverization, disintegration, and classification treatment-spheronization treatment. Examples of graphite include natural graphite and artificial graphite. Examples of artificial graphite include powders produced by firing coke such as needle coke or mosaic coke. The average particle diameter of the graphite is 10 μm or less and desirably 5 μm or less. This is because using the graphite having a small particle diameter readily generates voids inside particles and improves output characteristics.

Examples of the graphitizable binder include pitch and tar of coal-based, petroleum-based, artificial, and the like, thermoplastic resins, and thermosetting resins. To form voids, it is more preferable to mix an additive having a low residual carbon ratio. There is no particular limitation regarding the method for mixing the graphite and the binder, and mixing by using a device that can apply compressive shear is preferable since the binder is more homogeneously arranged and a harder power can be formed. There is no particular limitation regarding the mixing ratio of these, and the ratio of the residual carbon content of the binder component to the graphite is set to be preferably 1:99 to 30:70. There is no particular limitation regarding the heat treatment temperature, 1,500° C. or higher is desirable, and 2,500° C. or higher may be adopted.

The shell portion may be formed by, for example, a CVD method in which acetylene, methane, or the like is used or a method in which coal pitch, petroleum pitch, a phenol resin, or the like is mixed with a carbon material of the core portion and heat treatment is performed. Carbon-based active material B may be obtained by using the above-described production method.

Regarding the binder contained in the negative electrode mix layer 41, as in the positive electrode 11, fluororesins, PAN, polyimide resins, acrylic resins, polyolefin resins, and the like may be used. However, preferably, styrene butadiene rubber (SBR) is used. In addition, regarding the negative electrode mix layer 41, preferably, CMC or salts thereof, polyacrylic acid (PAA) or salts thereof, polyvinyl alcohols (PVA), and the like are contained. The type and the amount of the binder used may differ between the first layer 42 and the second layer 43.

Preferably, the first layer 42 contains PAA or a salt thereof in addition to SBR and CMC or a salt thereof. PAA or a salt thereof has strong adhesion to the silicon-based active material, and using PAA or a salt thereof enables the strength of the first layer 42 to be enhanced. The content of PAA or a salt thereof is preferably 0.1% to 3% by mass and more preferably 0.5% to 2% by mass relative to the total mass of the first layer 42. The content of PAA or a salt thereof may be measured by microscopic Raman spectroscopy, SEM-EDX, or the like.

[Separator]

Regarding the separator 13, a porous sheet having ion permeability and insulation performance is used. Specific examples of the porous sheet include microporous thin films, woven fabrics, and nonwoven fabrics. Olefin resins such as polyethylenes and polypropylenes, celluloses, and the like are suitable for the material for forming the separator 13. The separator 13 may have either a single-layer structure or a multilayer structure. A heat-resistant layer or the like may be disposed on the surface of the separator 13.

EXAMPLES

The present disclosure will be further described below with reference to the examples. However, the present disclosure is not limited to the examples.

Example 1

[Production of Positive Electrode]

Regarding a positive electrode active material, a lithium transition metal oxide represented by $Li_{1.0}Ni_{0.5}Co_{0.2}Mn_{0.3}O_2$ was used. The above-described positive electrode active material, acetylene black, and PVdF were mixed at a mass ratio of 94.8:4:1.2, and an appropriate amount of N-methyl-2-pyrrolidone was added so as to prepare a positive electrode mix slurry. Both surfaces of a positive electrode collector composed of aluminum foil, excluding a portion to be connected to a lead, was coated with the resulting positive electrode mix slurry, the coating film was dried, and, thereafter, the coating film was rolled by using a roller. Cutting into a predetermined electrode size was performed so as to produce a positive electrode in which both surfaces of the positive electrode collector were provided with the positive electrode mix layer.

[Preparation of First Negative Electrode Mix Slurry]

Graphite having a 10% compressive strength of 2.1 MPa (carbon-based active material A), $SiO_x$ (x=0.94) having a carbon coating film, CMC sodium salt, and SBR at a mass ratio of 88:9:1:1 were mixed, and an appropriate amount of water was added so as to prepare a first negative electrode mix slurry for a first layer.

[Preparation of Second Negative Electrode Mix Slurry]

Graphite having a 10% compressive strength of 5.7 MPa (carbon-based active material B), PAA lithium salt, CMC sodium salt, and SBR at a mass ratio of 97:1:1:1 were mixed, and an appropriate amount of water was added so as to prepare a second negative electrode mix slurry for a second layer.

[Production of Negative Electrode]

Both surfaces of a negative electrode collector composed of copper foil, excluding a portion to be connected to a lead, were coated with the first negative electrode mix slurry and the coating film was dried so as to form the first layer. Thereafter, the first layer was coated with the second negative electrode mix slurry and the coating film was dried so as to form the second layer. Subsequently, the coating films (first layer and second layer) were rolled by using a roller. Cutting into a predetermined electrode size was performed so as to produce a negative electrode in which both surfaces of the negative electrode collector were provided with the negative electrode mix layer including the first layer and the second layer. The thickness of each of the first layer and the second layer of the negative electrode mix layer was measured. As a result, the thickness ratio of second layer/first layer was 2.0.

[Preparation of Nonaqueous Electrolyte]

$LiPF_6$ was dissolved into a mixed solvent in which ethylene carbonate (EC) and ethyl methyl carbonate (EMC) were mixed at a volume ratio of 3:7 so that the concentration became 1.0 mol/liter. Further, vinylene carbonate (VC) was dissolved into the above-described mixed solvent at a concentration of 2% by volume so as to prepare a nonaqueous electrolyte.

[Production of Test Cell]

A lead was attached to each of the positive electrode and the negative electrode, and the electrodes were rolled into a spiral shape with a polypropylene separator interposed therebetween so as to produce an electrode body having a rolled structure. The resulting electrode body was stored into a battery outer jacket member composed of an aluminum laminate sheet, and the above-described nonaqueous electrolyte was injected. Thereafter, the outer jacked member was sealed so as to produce a test cell (laminate cell) with a design capacity of 640 mAh.

Regarding the negative electrode active material and the test cell of each of the examples and the comparative examples, evaluations were performed by the following methods. The evaluation results are shown in Table 1.

[Measurement of 10% Compressive Strength of Carbon-Based Active Material]

A micro compression tester (MCT-211) produced by SHIMADZU CORPORATION) was used. A pressure when a particle having a particle diameter equal to D50 of each carbon-based active material was compressed by 10% on a volume basis was measured as the 10% compressive strength.

[Measurement of Porosity of Carbon-Based Active Material]

After a sample electrode or an observation target electrode is embedded in an epoxy resin, a cross section was formed by using an ion milling system (Cross Section Polisher) produced by JEOL LTD. Subsequently, the cross section was observed with a scanning electron microscope (SEM), the area of the cross section of the active material and the area of voids contained in the cross section were calculated, and the ratio of these areas was denoted as the porosity.

[Measurement of Amount of Amorphous Component in Carbon-Based Active Material]

The amount of the amorphous component in the carbon-based active material contained in the negative electrode mix layer (first layer and second layer) was evaluated on the basis of Raman spectroscopic measurement. As described above, the peak intensity ratio (R-value) of D-band/G-band in the Raman spectrum of a carbon-based active material can be used as an indicator of the amount of amorphous carbon, and a higher ratio indicates that the amount of amorphous carbon is larger. The first layer and the second layer were subjected to the Raman spectroscopic measurement, the D-band/G-band ratio of each layer was determined, and the amount of the amorphous component was calculated from the resulting ratio.

[Measurement of BET Specific Surface Area of Carbon-Based Active Material]

The BET specific surface area of the carbon-based active material was measured by using Tristar produced by micromeritics.

[Evaluation of Resistance Increasing Rate After Cycle Test]

The test cell was charged at a constant current of 0.5 lt to a half of an initial capacity in a temperature environment of 25° C. Thereafter, charging was stopped, and the resulting state was left to stand for 15 minutes. Subsequently, charging was performed at a constant current of 0.1 lt for 10 seconds, and the voltage at this time was measured. After the capacity charged for 10 seconds was discharged, charging was performed for 10 seconds at a different current, the voltage at this time was measured, and the capacity charged for 10 seconds was discharged. The above-described charging, discharging, and voltage measurement were repeated while the current was changed in the range of 0.1 lt to 2 lt. The resistance value was determined from the relationship between the measured voltage value and current value and was denoted as the resistance value before the cycle test.

The cycle test was performed under the following conditions. The resistance value after 200 cycles was determined by the above-described method, and the increasing rate of the resistance value after 200 cycles relative to the resistance value before the cycle test was calculated.

(Cycle Test)

The test cell was subjected to constant-current charging at a constant current of 0.5 lt in a temperature environment of 25° C. until the battery voltage reached 4.2 V, and constant-voltage charging was performed at 4.2 V until the current reached 1/50 lt. Thereafter, constant-current discharging was performed at a constant current of 0.5 lt until the voltage reached 2.5 V. The charging-discharging cycle was repeated 200 cycles.

Example 2

A negative electrode and a test cell were produced in the same manner as in example 1 except that graphite having a 10% compressive strength of 6.6 MPa, a porosity of 2%, an amount of amorphous component of 1.5% by mass, and a BET specific surface area of 4.4 m$^2$/g was used as carbon-based active material B.

Example 3

A negative electrode and a test cell were produced in the same manner as in example 1 except that graphite having a 10% compressive strength of 27 MPa, a porosity of 3.1%, an amount of amorphous component of 4.0% by mass, and a BET specific surface area of 3.0 m$^2$/g was used as carbon-based active material B.

Comparative Example 1

A negative electrode and a test cell were produced in the same manner as in example 1 except that graphite having a 10% compressive strength of 2.1 MPa, a porosity of 4.2%, an amount of amorphous component of 0.6% by mass, and a BET specific surface area of 4.0 m$^2$/g was used as carbon-based active material B and except that $SiO_x$ (x=0.94) was added to the second layer at the same content as in the first layer.

Comparative Example 2

A negative electrode and a test cell were produced in the same manner as in comparative example 1 except that $SiO_x$ (x=0.94) was not added to the second layer.

Comparative Example 3

A negative electrode and a test cell were produced in the same manner as in comparative example 1 except that graphite having a 10% compressive strength of 5.7 MPa, a porosity of 2.5%, an amount of amorphous component of 1.5% by mass, and a BET specific surface area of 4.4 m$^2$/g was used as carbon-based active material B.

Comparative Example 4

A negative electrode and a test cell were produced in the same manner as in comparative example 1 except that graphite having a 10% compressive strength of 44 MPa, a porosity of 0%, an amount of amorphous component of 0.5% by mass, and a BET specific surface area of 0.9 m$^2$/g was used as carbon-based active material B.

TABLE 1

|  |  | Second layer | | | | | First layer | | | | | Resistance increasing rate % |
|---|---|---|---|---|---|---|---|---|---|---|---|---|
|  | SiO addition — | Graphite 10% compressive strength MPa | Graphite porosity % | Amorphous component % by mass | R-value — | BET m$^2$/g | Graphite 10% compressive strength MPa | Graphite porosity % | Amorphous component % by mass | R-value — | BET m$^2$/g | |
| Comparative example 1 | yes | 2.1 | 4.2 | 0.6 | 0.092 | 4.0 | 2.1 | 4.2 | 0.6 | 0.092 | 4.0 | 7 |
| Comparative example 2 | none | 2.1 | 4.2 | 0.6 | 0.092 | 4.0 | 2.1 | 4.2 | 0.6 | 0.092 | 4.0 | 7 |
| Comparative example 3 | yes | 5.7 | 2.5 | 1.5 | 0.386 | 4.4 | 2.1 | 4.2 | 0.6 | 0.092 | 4.0 | 12 |

TABLE 1-continued

|  | SiO addition | Second layer | | | | | First layer | | | | | Resistance increasing rate % |
|---|---|---|---|---|---|---|---|---|---|---|---|---|
|  |  | Graphite 10% compressive strength MPa | Graphite porosity % | Amorphous component % by mass | R-value — | BET m²/g | Graphite 10% compressive strength MPa | Graphite porosity % | Amorphous component % by mass | R-value — | BET m²/g |  |
| Comparative example 4 | yes | 44 | 0 | 0.5 | 0.120 | 0.9 | 2.1 | 4.2 | 0.6 | 0.092 | 4.0 | 15 |
| Example 1 | none | 5.7 | 2.5 | 1.5 | 0.386 | 4.4 | 2.1 | 4.2 | 0.6 | 0.092 | 4.0 | 5 |
| Example 2 | none | 6.6 | 2 | 1.5 | 0.473 | 4.4 | 2.1 | 4.2 | 0.6 | 0.092 | 4.0 | 4 |
| Example 3 | none | 27 | 3.1 | 4.0 | 0.532 | 3.0 | 2.1 | 4.2 | 0.6 | 0.092 | 4.0 | 3 |

As shown in Table 1, the test cell of each example had lower resistance increasing rate after the cycle test than the test cells of the comparative examples. In particular, an effect of suppressing the resistance was enhanced as the 10% compressive strength of carbon-based active material B contained in the second layer increased.

REFERENCE SIGNS LIST 10 nonaqueous electrolyte secondary battery
11 positive electrode
12 negative electrode
13 separator
14 electrode body
15 battery case
16 outer jacket can
17 sealing body
18, 19 insulating plate
20 positive electrode lead
21 negative electrode lead
22 overhanging portion
23 filter
24 lower valve body
25 insulating member
26 upper valve body
27 cap
28 gasket
30 positive electrode collector
31 positive electrode mix layer
40 negative electrode collector
41 negative electrode mix layer
42 first layer
43 second layer

The invention claimed is:

1. A negative electrode for nonaqueous electrolyte secondary battery comprising a negative electrode collector and a negative electrode mix layer disposed on the negative electrode collector,
wherein the negative electrode mix layer includes a first layer and a second layer disposed successively from the negative electrode collector,
the first layer contains a first carbon-based active material having a 10% compressive strength of 3 MPa or less, and the first layer further contains a silicon-based active material containing Si, and
the second layer contains a second carbon-based active material having a 10% compressive strength of 5 MPa or more, and the second layer has a lower content of the silicon-based active material than the first layer,
wherein the first carbon-based active material constitutes a sole carbon-based active material in the first layer, and the second carbon-based active material constitutes a sole carbon-based active material in the second layer.

2. The negative electrode for nonaqueous electrolyte secondary battery according to claim 1, wherein the second layer contains substantially no silicon-based active material.

3. The negative electrode for nonaqueous electrolyte secondary battery according to claim 1, wherein the second carbon-based active material has a porosity of 1% to 5%.

4. The negative electrode for nonaqueous electrolyte secondary battery according to claim 1, wherein the second carbon-based active material contains 1% to 5% by mass of amorphous component.

5. The negative electrode for nonaqueous electrolyte secondary battery according to claim 1, wherein the thickness of the second layer is 20% to 70% of the thickness of the negative electrode mix layer.

6. The negative electrode for nonaqueous electrolyte secondary battery according to claim 1, wherein a median diameter on a volume basis of the silicon-based active material is 0.5 times or less a median diameter on a volume basis of the first carbon-based active material.

7. A nonaqueous electrolyte secondary battery comprising:
the negative electrode for nonaqueous electrolyte secondary battery according to claim 1;
a positive electrode;
a separator; and
a nonaqueous electrolyte.

* * * * *